(12) United States Patent
Nunez et al.

(10) Patent No.: US 7,677,107 B2
(45) Date of Patent: Mar. 16, 2010

(54) WIRELESS PRESSURE SENSOR AND METHOD FOR FABRICATING WIRELESS PRESSURE SENSOR FOR INTEGRATION WITH AN IMPLANTABLE DEVICE

(75) Inventors: Anthony I. Nunez, Beachwood, OH (US); Harry D. Rowland, East Peoria, IL (US)

(73) Assignee: Endotronix, Inc., Peoria, IL (US)

( * ) Notice: Subject to any disclaimer, the term of this patent is extended or adjusted under 35 U.S.C. 154(b) by 0 days.

(21) Appl. No.: 12/167,109

(22) Filed: Jul. 2, 2008

(65) Prior Publication Data

US 2009/0007679 A1    Jan. 8, 2009

Related U.S. Application Data

(60) Provisional application No. 60/947,917, filed on Jul. 3, 2007.

(51) Int. Cl.
*G01L 9/12* (2006.01)

(52) U.S. Cl. ........................... 73/718; 73/724

(58) Field of Classification Search ............ 73/718, 73/724
See application file for complete search history.

(56) References Cited

U.S. PATENT DOCUMENTS

| | | | |
|---|---|---|---|
| 3,943,915 A | 3/1976 | Severson | |
| 4,026,276 A | 5/1977 | Chubbuck | |
| 4,385,636 A | 5/1983 | Cosman | |
| 4,531,244 A | 7/1985 | Hamas | |
| 4,701,826 A * | 10/1987 | Mikkor | 361/283.4 |
| 4,730,496 A * | 3/1988 | Knecht et al. | 73/724 |
| 5,005,577 A | 4/1991 | Frenkel | |
| 5,522,267 A | 6/1996 | Lewis | |
| 6,025,725 A | 2/2000 | Gershenfeld et al. | |
| 6,053,873 A | 4/2000 | Govari et al. | |
| 6,111,520 A | 8/2000 | Allen et al. | |
| 6,150,681 A | 11/2000 | Allen | |
| 6,171,252 B1 | 1/2001 | Roberts | |
| 6,278,379 B1 | 8/2001 | Allen et al. | |
| 6,287,256 B1 | 9/2001 | Park et al. | |
| 6,312,380 B1 | 11/2001 | Hoek et al. | |

(Continued)

FOREIGN PATENT DOCUMENTS

WO    2007041584 A2    4/2004

OTHER PUBLICATIONS

An International Search Report, dated Nov. 14, 2008, for corresponding PCT patent application No. PCT/US2008/069217 filed Jul. 3, 2008 (4 pages).

*Primary Examiner*—Andre J Allen
(74) *Attorney, Agent, or Firm*—McDonald Hopkins LLC (57) ABSTRACT

A method for fabricating a wireless pressure sensor includes providing a first substrate. A portion of the first substrate is controllably displaced to form a cavity. A conducting material is patterned on the first substrate to form a first capacitor plate and a first inductor. A second substrate is provided. A conducting material is patterned on the second substrate to form a second capacitor plate. The second substrate is attached to the first substrate to seal the cavity such that at least a portion of the second substrate is movable with respect to the first substrate within the cavity in response to a change in an external condition. A hermetically sealed capacitive pressure sensor may reside in the cavity between the first substrate and second substrate.

28 Claims, 8 Drawing Sheets

U.S. PATENT DOCUMENTS

| | | | |
|---|---|---|---|
| 6,416,474 B1 | 7/2002 | Penner et al. | |
| 6,432,737 B1 | 8/2002 | Webster | |
| 6,441,503 B1 | 8/2002 | Webster | |
| 6,442,413 B1 | 8/2002 | Silver | |
| 6,447,449 B1 | 9/2002 | Fleischman et al. | |
| 6,505,516 B1 | 1/2003 | Frick et al. | |
| 6,517,481 B2 | 2/2003 | Hoek et al. | |
| 6,532,834 B1 | 3/2003 | Pinto et al. | |
| 6,535,116 B1 | 3/2003 | Zhou | |
| 6,579,235 B1 | 6/2003 | Abita et al. | |
| 6,662,663 B2 * | 12/2003 | Chen | 73/718 |
| 6,667,725 B1 | 12/2003 | Simons et al. | |
| 6,682,490 B2 | 1/2004 | Roy et al. | |
| 6,749,568 B2 | 6/2004 | Fleischman et al. | |
| 6,757,566 B2 | 6/2004 | Weiner et al. | |
| 6,764,446 B2 | 7/2004 | Wolinsky et al. | |
| 6,789,429 B2 | 9/2004 | Pinto et al. | |
| 6,840,956 B1 | 1/2005 | Wolinsky et al. | |
| 6,855,115 B2 | 2/2005 | Fonseca et al. | |
| 6,890,300 B2 | 5/2005 | Lloyd et al. | |
| 6,926,670 B2 | 8/2005 | Rich et al. | |
| 6,939,299 B1 | 9/2005 | Petersen et al. | |
| 6,968,743 B2 | 11/2005 | Rich et al. | |
| 6,994,666 B2 | 2/2006 | Shannon et al. | |
| 6,994,672 B2 | 2/2006 | Fleischman et al. | |
| 7,004,034 B2 * | 2/2006 | Chen | 73/724 |
| 7,025,778 B2 | 4/2006 | Hayashi et al. | |
| 7,059,195 B1 | 6/2006 | Liu et al. | |
| 7,059,196 B1 | 6/2006 | Liu et al. | |
| 7,131,945 B2 | 11/2006 | Fink et al. | |
| 7,146,861 B1 | 12/2006 | Cook et al. | |
| 7,147,604 B1 | 12/2006 | Allen et al. | |
| 7,169,106 B2 | 1/2007 | Fleischman et al. | |
| 7,181,975 B1 | 2/2007 | Bradley et al. | |
| 7,219,021 B2 | 5/2007 | Liu et al. | |
| 7,245,117 B1 | 7/2007 | Joy et al. | |
| 7,252,006 B2 | 8/2007 | Tai et al. | |
| 7,252,010 B2 | 8/2007 | Ohta et al. | |
| 7,261,733 B1 | 8/2007 | Brown et al. | |
| 7,290,454 B2 | 11/2007 | Liu | |
| 7,347,822 B2 | 3/2008 | Brockway et al. | |
| 7,347,826 B1 | 3/2008 | Karicherla et al. | |
| 2002/0045921 A1 | 4/2002 | Wolinsky et al. | |
| 2005/0080346 A1 | 4/2005 | Gianchandani et al. | |
| 2005/0187482 A1 | 8/2005 | O'Brien et al. | |
| 2005/0287287 A1 | 12/2005 | Parker et al. | |
| 2006/0107749 A1 | 5/2006 | Liu et al. | |
| 2006/0117859 A1 | 6/2006 | Liu et al. | |
| 2006/0144155 A1 | 7/2006 | Liu | |
| 2006/0177956 A1 | 8/2006 | O'Brien et al. | |
| 2006/0219022 A1 | 10/2006 | Ohta et al. | |
| 2006/0241354 A1 | 10/2006 | Allen | |
| 2006/0247724 A1 | 11/2006 | Gerber et al. | |
| 2006/0287602 A1 | 12/2006 | O'Brien et al. | |
| 2006/0287700 A1 | 12/2006 | White et al. | |
| 2007/0060959 A1 | 3/2007 | Salo et al. | |
| 2007/0061089 A1 | 3/2007 | Liu et al. | |
| 2007/0074579 A1 | 4/2007 | Cook et al. | |
| 2007/0142727 A1 | 6/2007 | Zhang et al. | |
| 2007/0157734 A1 | 7/2007 | Skwara | |
| 2007/0191717 A1 | 8/2007 | Rosen et al. | |
| 2007/0261497 A1 * | 11/2007 | O'Brien et al. | 73/724 |
| 2007/0274565 A1 | 11/2007 | Penner | |
| 2007/0282210 A1 | 12/2007 | Stern | |
| 2008/0033527 A1 | 2/2008 | Nunez et al. | |
| 2008/0058632 A1 | 3/2008 | Tai et al. | |
| 2008/0082005 A1 | 4/2008 | Stern et al. | |

* cited by examiner

WIRELESS PRESSURE SENSOR AND METHOD FOR FABRICATING WIRELESS PRESSURE SENSOR FOR INTEGRATION WITH AN IMPLANTABLE DEVICE

CROSS REFERENCE TO RELATED APPLICATIONS

This application claims the benefit of U.S. Provisional Application No. 60/947,917, filed Jul. 3, 2007, which is hereby incorporated by reference in its entirety.

BACKGROUND OF THE INVENTION

The subject matter disclosed herein relates generally to a wireless pressure sensor and, more particularly, to methods for fabricating wireless pressure sensors and integrating the wireless pressure sensors with an implantable device, such as an endovascular stent or graft.

BRIEF DESCRIPTION OF THE INVENTION

In one aspect, a method for fabricating a wireless pressure sensor is provided. The method includes providing a first substrate. A portion of the first substrate is controllably displaced to form a cavity. A conducting material is patterned on the first substrate to form a first capacitor plate and a first inductor. A second substrate is provided. A conducting material is patterned on the second substrate to form a second capacitor plate. The second substrate is attached to the first substrate to seal the cavity such that at least a portion of the second substrate is movable with respect to the first substrate within the cavity in response to a change in an external condition.

In another aspect, a wireless pressure sensor is provided. The wireless pressure sensor includes a first substrate that defines a cavity. A first conducting material is patterned on the first substrate. The patterned conducting material forms a first capacitor plate and a first inductor. A second substrate is coupled to the first substrate. A second conducting material is patterned on the second substrate. The patterned conducting material forms a second capacitor plate. The second substrate is coupled to the first substrate to seal the cavity such that at least a portion of the second substrate is movable with respect to the first substrate within the cavity in response to a change in an external condition.

In yet another aspect, a method for fabricating a flexible sheet of wireless sensors is provided. The method includes providing a first substrate. A plurality of portions of the first substrate are controllably displaced to form a plurality of cavities. A conducting material is patterned to form a plurality of corresponding first capacitor plates and corresponding first inductors. A second substrate is provided. A conducting material is patterned on the second substrate to form a plurality of second capacitor plates. The second substrate is attached to the first substrate to seal each cavity such that at least a portion of the second substrate is movable with respect to the first substrate within the cavity in response to a change in an external condition.

In another aspect, a method is provided for fabricating an endovascular implant from a sheet of flexible material including at least one wireless sensor. The method includes providing a sheet of flexible material. Conductive traces are patterned diagonally across the sheet of flexible material such that when the flexible sheet is positioned about a tubular cylindrical mold structure, the conductive traces are aligned to create an inductor coil. Alternatively, the conductive traces may form a continuous inductor coil not fully wrapped around the mold structure. At least one sensor is affixed to the sheet of flexible material, the at least one sensor electrically connected to the inductor coil. The sheet of flexible material is wrapped about the tubular cylindrical mold structure such that the inductor coil wraps circumferentially around the sheet of flexible material. Additional sheets of flexible material may cover the inductor coil and the at least one sensor such that the inductor coil and the at least one sensor are not readily exposed to bodily fluids.

DETAILED DESCRIPTION OF THE INVENTION

The present disclosure describes exemplary systems and methods for fabricating one or more wireless sensors, such as one or more pressure sensors, from polymer substrates or rigid substrates and integrating at least one wireless sensor in an implantable endovascular device, such as an endovascular or intraluminal stent or graft.

Figure 1:
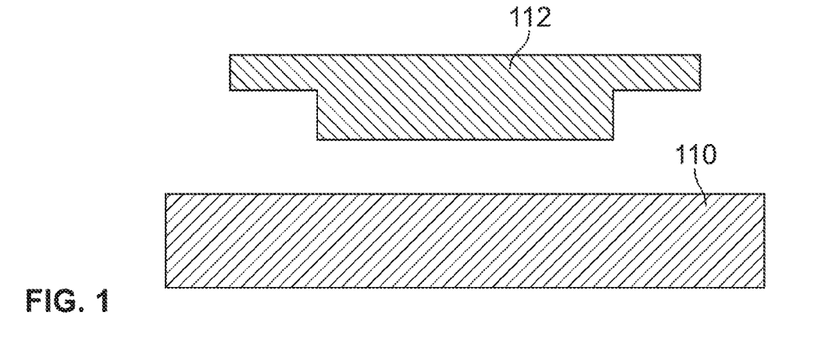
FIGS. 1-6 are schematic partial section view illustrating an exemplary system and method for fabricating one or more wireless pressure sensors.
Figure 2:
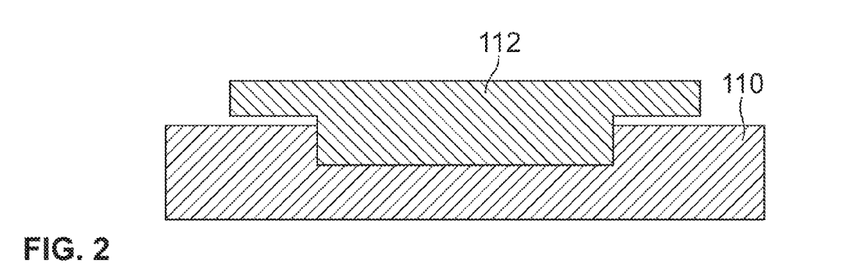
Figure 3:
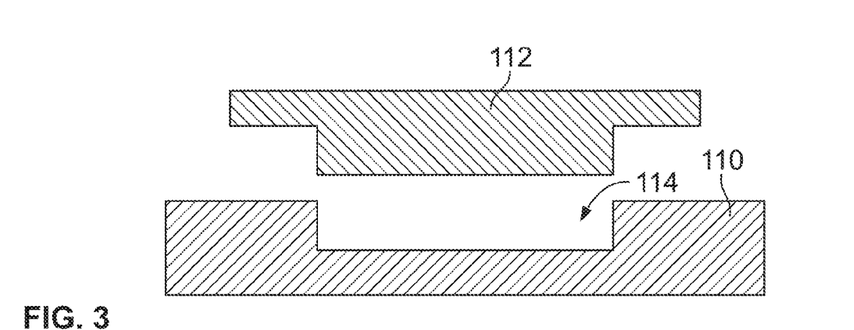
Figure 4:
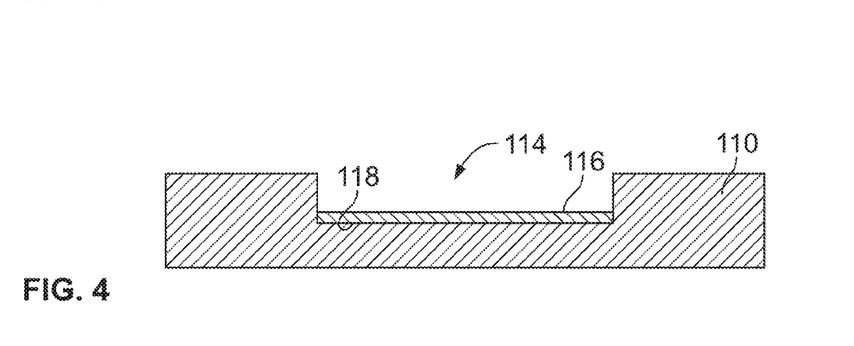

FIGS. 1-6 are schematic partial sectional views illustrating an exemplary system and method for fabricating one or more sensors, such as one or more wireless pressure sensors 100, from one or more suitable polymer substrates or one or more suitable rigid substrates. In the exemplary embodiment, wireless pressure sensor 100 includes a first polymer substrate 110. Suitable polymer materials for first polymer substrate 110 include, without limitation, a non-porous or low porosity polymer, such as polytetrafluoroethylene, expanded polytetrafluoroethylene (ePTFE), such as an ePTFE having a reduced permeability as related to an increased cross-linking and a decreased intermodal distance, other suitable fluoropolymers, and/or any suitable polymer material known to those skilled in the art and guided by the teachings herein provided. A master mold 112 is positioned with respect to first polymer substrate 110 and pressed into first polymer substrate 110, as shown in FIG. 2, to controllably displace a portion of first polymer substrate 110 and mold or define a cavity 114 within first polymer substrate 110, as shown in FIG. 3. Alternatively, cavity 114 may be formed using any suitable process including, without limitation, a lithography and chemical etching, an ink jet printing, and/or a laser writing process known to those skilled in the art and guided by the teachings herein provided. A pattern of electrically conducting material including a first patterned capacitor plate 116 is layered or deposited on a surface 118 of first polymer substrate 110, as shown in FIG. 4. In one embodiment, a hermetically sealed capacitive pressure sensor may reside in cavity 114 above first patterned capacitor plate 116. In one embodiment, first patterned capacitor plate 116 resides on an outer surface of a hermetically sealed capacitive pressure sensor. In a particular embodiment, a hermetically sealed capacitive pressure sensor may reside in cavity 114 between first polymer substrate 110 and second substrate 124. At least a portion of the hermetically sealed capacitive pressure sensor is movable in response to a change in an external condition. As used herein, references to a "hermetically sealed capacitive pressure sensor" may also refer to a hermetically sealed chamber with a deflectable membrane, wherein the hermetically sealed chamber may have electrically conducting areas on one or more surfaces.

Figure 5:
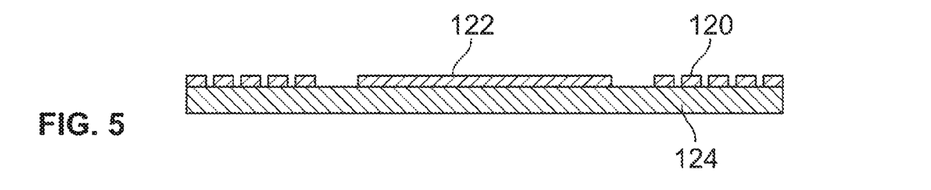
Figure 6:
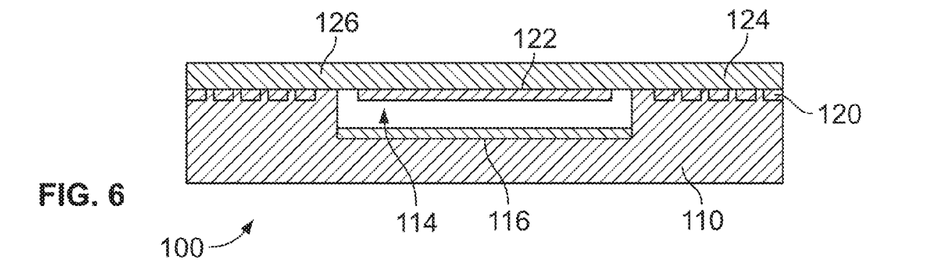
Figure 7:
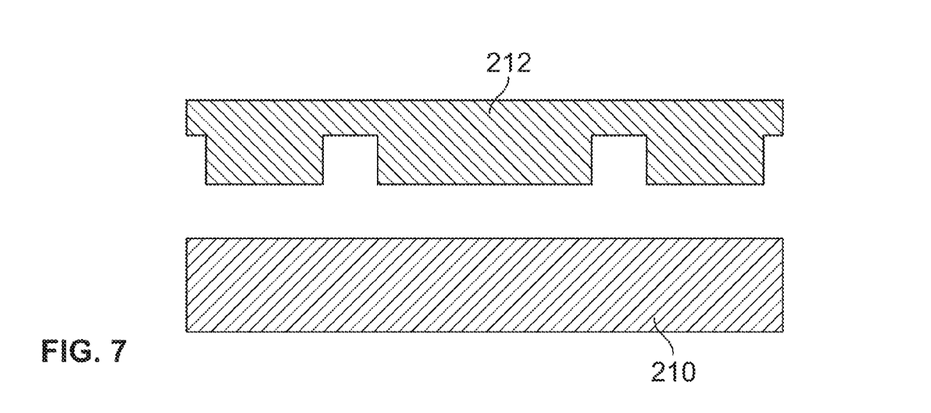
FIGS. 7-14 are schematic partial section view illustrating an alternative exemplary system and method for fabricating one or more wireless pressure sensors.

As shown in FIG. 5, a pattern of electrically conducting material including an inductor 120 electrically connected to a second patterned capacitor plate 122 is layered onto a second polymer substrate 124. In one embodiment, second polymer substrate 124 includes a suitable polymer material such as described above in reference to first polymer substrate 110. Second polymer substrate 124 may be formed of the same polymer material or a different polymer material as the polymer material forming first polymer substrate 110. Second polymer substrate 124, including inductor 120 and second patterned capacitor plate 122, is attached to first polymer substrate 110 to hermetically seal cavity 114. A hermetically sealed capacitive pressure sensor may reside in cavity 114 between first polymer substrate 110 and second polymer substrate 124. First patterned capacitor plate 116 and/or second patterned capacitor plate 122 may be mechanically and electrically coupled to the hermetically sealed capacitive pressure sensor. In an alternative embodiment, the hermetically sealed capacitive pressure sensor may have capacitor plates on external surfaces that may be mechanically or electrically coupled to inductor 120. At least a portion of the hermetically sealed capacitive pressure sensor is movable in response to a change in an external condition. As shown in FIG. 6, in one embodiment first polymer substrate 110 and second polymer substrate 124 are axially aligned and laminated to form wireless pressure sensor 100 with second polymer substrate 124 directly above cavity 114. In one embodiment, second polymer substrate 124 includes a membrane that is movable toward first polymer substrate 110 in response to a change in an external condition. In one embodiment, first polymer substrate 110 and second polymer substrate 124 are coated with one or more additional layers of non-porous or low-porosity materials on one or more surfaces such that when attached or laminated, first polymer substrate 110 and second polymer substrate 124 form a hermetically sealed cavity 114. Second polymer substrate 124 may be attached or coupled to first polymer substrate 110 using any suitable process including, without limitation, an adhesive bonding, laminating, and/or laser welding process. In one embodiment, inductor 120 on second polymer substrate 124 is electrically connected to first patterned capacitor plate 116 on first polymer substrate 110 during the attachment process. In an alternative embodiment, inductor 120 may reside on a separate plane or surface than second patterned capacitor plate 122.

In a further embodiment, one or more surfaces of pressure sensor 100, such as an external surface 126, is textured with a controlled topography that includes features, such as undulations, raised regions or ridges and/or recessed regions or valleys, having suitable dimensions including a height, a width and/or a length, ranging from about 10 nanometers (nm) to about 100 microns (μm) such that properties of blood flow at or near external surface 126 may be modified. In one embodiment, patterning external surface 126 may modify coagulation properties of pressure sensor 100 to prevent or limit endothelialization and reduce a risk of thrombosis and/or embolism. Patterning external surface 126 may also modify flow properties of blood at or near external surface 126 to promote or reduce slip at or near external surface 126 to alter a laminar flow characteristic and/or a turbulent flow characteristic of blood flowing across pressure sensor 100. The controlled topography may also form small wells that may be filled with a slow release polymer that has been impregnated with an anitmetabolite substance that inhibits cell division, such as Tacrolimus or Sirolimus. The filled wells may then be covered with a porous polymer layer to allow a time-controlled release of a drug. In further embodiments, external surface 126 of pressure sensor 100 may be coated with a deactivated heparin bonded material having anti-coagulation and/or antimetabolite characteristics.

In an alternative embodiment, pressure sensor 100 shown in FIGS. 1-6 is fabricated in rigid substrates, such as a fused silica, glass, or high resistivity silicon material. Cavities are formed or defined in the rigid substrates using a suitable process known to those skilled in the art and guided by the teachings herein provided including, without limitation, a wet or dry chemical etch process. The surfaces may be patterned with electrically conducting material in a similar manner to the patterning on polymer substrates, as described above. The rigid substrates may be attached or coupled using any suitable process including, without limitation, a fusion bonding, anodic bonding, laser welding, and/or adhesive sealing process. A hermetically sealed capacitive pressure sensor may reside in the cavity between the first substrate and second substrate. At least a portion of the hermetically sealed capacitive pressure sensor is movable in response to a change in an external condition.

Figure 8:
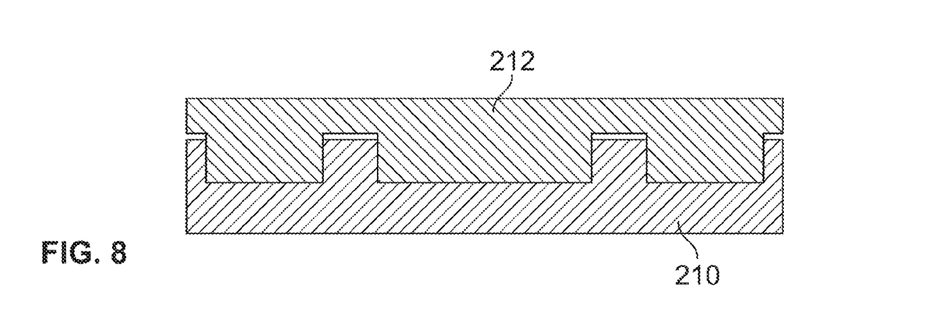
Figure 9:
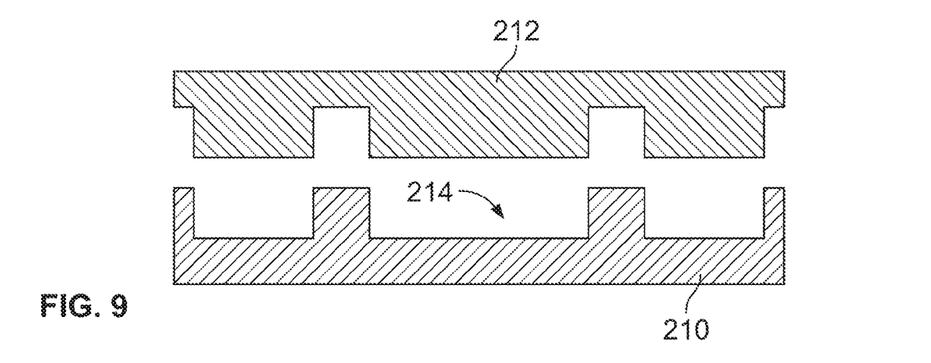
Figure 10:
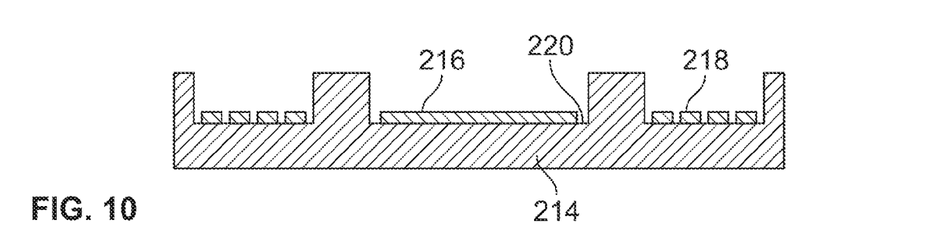

FIGS. 7-14 are schematic partial sectional views illustrating an alternative exemplary system and method for fabricating one or more sensors, such as one or more wireless pressure sensors 200, from one or more suitable polymer substrates or one or more suitable rigid substrates. In the exemplary embodiment, wireless pressure sensor 200 includes a first polymer substrate 210. Suitable polymer materials for first polymer substrate 210 include, without limitation, a non-porous or low porosity polymer, such as polytetrafluoroethylene, expanded polytetrafluoroethylene (ePTFE), such as an ePTFE having a reduced permeability as related to an increased cross-linking and a decreased intermodal distance, other suitable fluoropolymers, and/or any suitable polymer material known to those skilled in the art and guided by the teachings herein provided. A master mold 212 is positioned with respect to first polymer substrate 210 and pressed into first polymer substrate 210, as shown in FIG. 8, to mold or define a cavity 214 within first polymer substrate 210, as shown in FIG. 9. In alternative embodiments, cavity 214 is formed using any suitable process including, without limitation, a lithography and chemical etching, an ink jet printing, and/or a laser writing process known to those skilled in the art and guided by the teachings herein provided. A pattern of electrically conducting material including a first patterned capacitor plate 216 electrically connected to a first inductor 218 is layered or deposited on a surface 220 of first polymer substrate 210, as shown in FIG. 10. In alternative embodiments, first inductor 218 may reside on a separate plane or surface than first patterned capacitor plate 216. In one embodiment, a hermetically sealed capacitive pressure sensor may reside in cavity 214. At least a portion of the hermetically sealed capacitive pressure sensor is movable in response to a change in an external condition.

Figure 11:
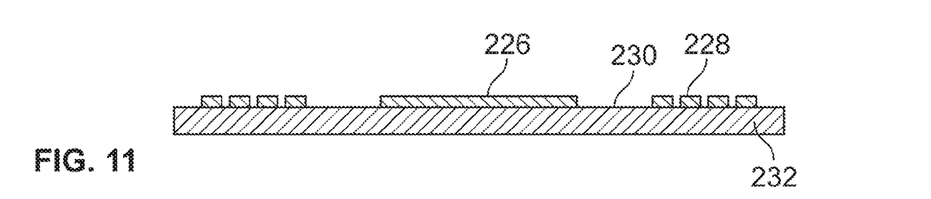
Figure 12:
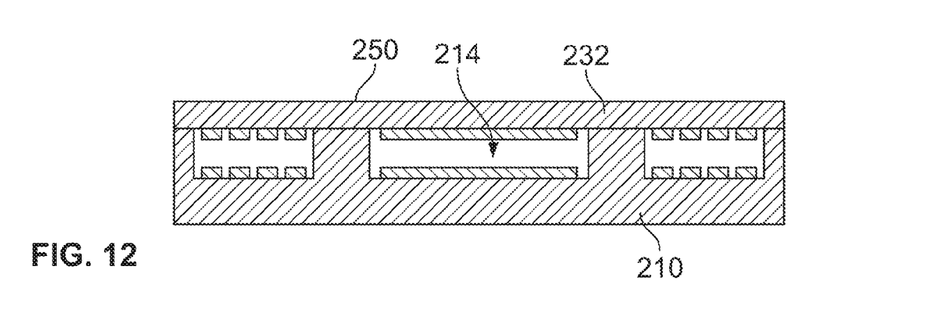

As shown in FIG. 11, a pattern of electrically conducting material including a second patterned capacitor plate 226 electrically connected to a second inductor 228 is layered onto a surface 230 of a second polymer substrate 232. In one embodiment, second polymer substrate 232 includes a suitable polymer material such as described above in reference to first polymer substrate 210. Second polymer substrate 232 may be formed of the same polymer material or a different polymer material as the polymer material forming first polymer substrate 210. Second polymer substrate 232, including second patterned capacitor plate 226 and second inductor 228, is attached or coupled to first polymer substrate 210 to hermetically seal cavity 214. As shown in FIG. 12, in one embodiment first polymer substrate 210 and second polymer substrate 232 are axially aligned and laminated to form wireless pressure sensor 200 with second polymer substrate 232 directly above cavity 214. In one embodiment, second polymer substrate 232 includes a membrane that is movable toward first polymer substrate 210 in response to a change in an external condition. In a further embodiment, first polymer substrate 210 and/or second polymer substrate 232 are coated with one or more additional layers of non-porous or low-porosity material on one or more surfaces such that when attached or laminated, first polymer substrate 210 and second polymer substrate 232 form hermetically sealed cavity 214. Second polymer substrate 232 may be attached or coupled to first polymer substrate 210 using any suitable process including, without limitation, an adhesive bonding, laminating, and/or laser welding process. In one embodiment, second inductor 228 on second polymer substrate 232 is electrically connected to first patterned capacitor plate 216 on first polymer substrate 210 during the attachment process. In one embodiment, a hermetically sealed capacitive pressure sensor may reside in cavity 214. First patterned capacitor plate 216 and/or second patterned capacitor plate 226 may be mechanically and electrically coupled to the hermetically sealed capacitive pressure sensor. In an alternative embodiment, the hermetically sealed capacitive pressure sensor may have capacitor plates on external surfaces that may be mechanically or electrically coupled at least to first inductor 218 or second inductor 228. In one embodiment, second patterned capacitor plate 226 and/or second inductor 228 may reside outside cavity 214 on an external surface of second polymer substrate 232. The electrically conducting material on the external surface of second polymer substrate 232 may allow for tuning of sensor electrical properties after fabrication. In a further embodiment, additional layers of polymer or other suitable materials may coat the external surface of second polymer substrate 232.

Figure 13:
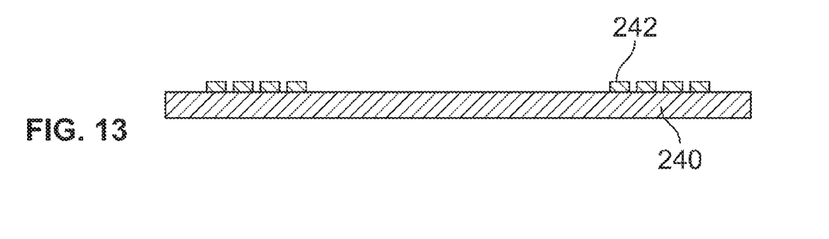
Figure 14:
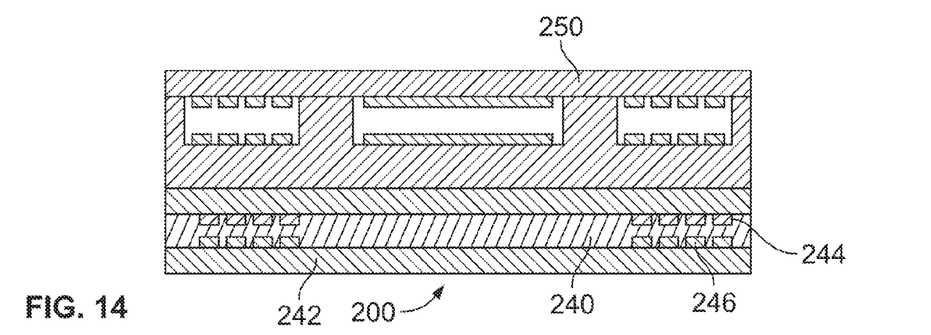

Referring to FIGS. 13 and 14, in one embodiment one or more additional polymer substrates, such as a third polymer substrate 240 and a fourth polymer substrate 242 are provided. In one embodiment third polymer substrate 240 and fourth polymer substrate 242 have an electrically conducting layer forming a third inductor 244 and a fourth inductor 246, respectively. In one embodiment, third polymer substrate 240 and/or fourth polymer substrate 242 includes a suitable polymer material such as described above in reference to first polymer substrate 210. Third polymer substrate 240 and/or fourth polymer substrate 242 may be formed of the same polymer material or a different polymer material as the polymer material forming first polymer substrate 210 and/or second polymer substrate 232. In this embodiment, third polymer substrate 240 is attached or laminated to first polymer substrate 210 in axial alignment and fourth polymer substrate 242 is attached or coupled to third polymer substrate 240 in axial alignment such that third inductor 244 and fourth inductor 246 are inductively coupled to inductor 218 formed on first polymer substrate 210 and second inductor 228 formed on second polymer substrate 232. In embodiment, third inductor 244 and fourth inductor 246 are electrically connected to each other and to first inductor 218 to form three inductors electrically connected in a series circuit. In one embodiment, the inductors may be on one or more surfaces of the polymer substrates. In one embodiment, the inductors are electrically connected in series by electrical vias. Third polymer substrate 240 and fourth polymer substrate 242 may be attached or coupled to pressure sensor 200 using any suitable process including, without limitation, an adhesive bonding, laminating, and/or laser welding process.

In a further embodiment, one or more surfaces of pressure sensor 200, such as an external surface 250, is textured with a controlled topography that includes features, such as undulations, raised regions or ridges and/or recessed regions or valleys, having suitable dimensions including a height, a width and/or a length, ranging from about 10 nm to about 100 µm such that properties of blood flow at or near external surface 250 may be modified. In one embodiment, patterning external surface 250 may modify coagulation properties of pressure sensor 200 to prevent or limit endothelialization and reduce a risk of thrombosis and/or embolism. Patterning external surface 250 may also modify flow properties of blood at or near external surface 250 to promote or reduce slip at or near external surface 250 to alter a laminar flow characteristic and/or a turbulent flow characteristic of blood flowing across pressure sensor 200. The controlled topography may also form small wells that may be filled with a slow release polymer that has been impregnated with an anitmetabolite substance that inhibits cell division, such as Tacrolimus or Sirolimus. The filled wells may then be covered with a porous polymer layer to allow a time-controlled release of a drug. In further embodiments, external surface 250 of pressure sensor 200 may be coated with a deactivated heparin bonded material having anti-coagulation and/or antimetabolite characteristics.

In an alternative embodiment, pressure sensor 200 shown in FIGS. 7-14 is fabricated in rigid substrates, such as a fused silica, glass, or high resistivity silicon material. Cavities are formed or defined in the rigid substrates using a suitable process known to those skilled in the art and guided by the teachings herein provided including, without limitation, a wet or dry chemical etch process. The surfaces may be patterned with electrically conducting material in a similar manner to the patterning on polymer substrates, as described above. The rigid substrates may be attached or coupled using any suitable process including, without limitation, a fusion bonding, anodic bonding, laser welding, and/or adhesive sealing process. A hermetically sealed capacitive pressure sensor may reside in the cavity between the first substrate and the second substrate. At least a portion of the hermetically sealed capacitive pressure sensor is movable in response to a change in an external condition.

FIGS. 15-19 are schematic partial sectional views illustrating an alternative exemplary system and method for fabricating one or more sensors, such as pressure sensor 300, including one or more inductors electrically connected or inductively coupled to pressure sensor 300.

Figure 19:
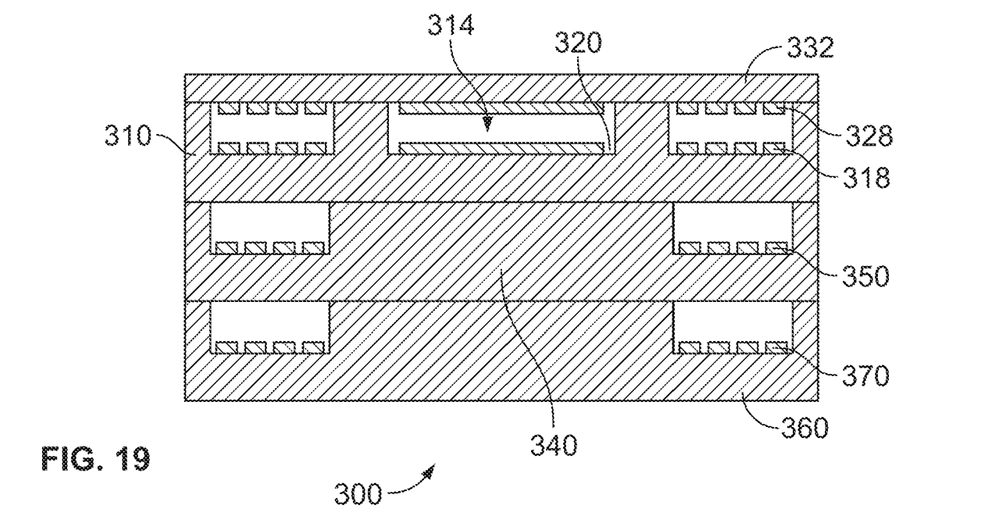

In the exemplary embodiment, pressure sensor 300 includes a first polymer substrate 310, as shown in FIG. 19. Suitable polymer materials for first polymer substrate 310 include, without limitation, a non-porous or low porosity polymer, such as polytetrafluoroethylene, expanded polytetrafluoroethylene, other suitable fluoropolymers, and/or any suitable polymer material known to those skilled in the art and guided by the teachings herein provided. First polymer substrate 310 defines a cavity 314 within first polymer substrate 310, as shown in FIG. 19. Cavity 314 is formed using any suitable process such as described above in reference to cavity 114 and/or cavity 214. A pattern of electrically conducting material including a first patterned capacitor plate 316 electrically connected to a first inductor 318 is layered or deposited on a surface 320 of first polymer substrate 310.

As shown in FIG. 19, a pattern of electrically conducting material including a second patterned capacitor plate 326 electrically connected to a second inductor 328 is layered onto a surface 330 of a second polymer substrate 332. In one embodiment, second polymer substrate 332 includes a suitable polymer material such as described above in reference to first polymer substrate 310. Second polymer substrate 332 may be formed of the same polymer material or a different polymer material as the polymer material forming first polymer substrate 310. Second polymer substrate 332, including second patterned capacitor plate 326 and second inductor 328, is attached or coupled to first polymer substrate 310 to hermetically seal cavity 314. In one embodiment, first polymer substrate 310 and second polymer substrate 332 are axially aligned and laminated to form wireless pressure sensor 300 with second polymer substrate 332 directly above cavity 314. A hermetically sealed capacitive pressure sensor may reside in cavity 314 between first polymer substrate 310 and second polymer substrate 332. At least a portion of the hermetically sealed capacitive pressure sensor is movable in response to a change in an external condition.

In one embodiment, second polymer substrate 332 includes a membrane that is movable toward first polymer substrate 310 in response to a change in an external condition. In a further embodiment, first polymer substrate 310 and/or second polymer substrate 332 are coated with one or more additional layers of non-porous or low-porosity material on one or more surfaces such that when attached or laminated, first polymer substrate 310 and second polymer substrate 332 form hermetically sealed cavity 314. Second polymer substrate 332 may be attached or coupled to first polymer substrate 310 using any suitable process including, without limitation, an adhesive bonding, laminating, and/or laser welding process. In one embodiment, second inductor 328 on second polymer substrate 332 is electrically connected to first capacitor plate 316 on first polymer substrate 310 during the attachment process.

Figure 15:
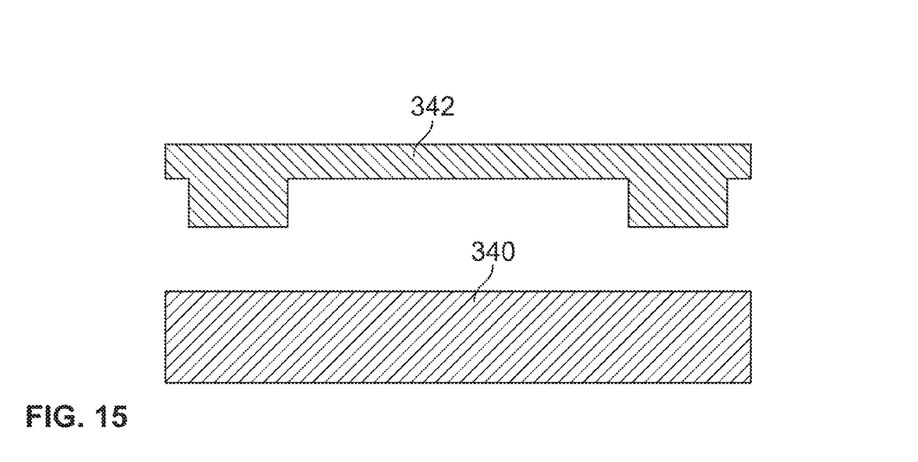
FIGS. 15-19 are schematic partial section view illustrating an exemplary system and method for electrically connecting or inductively coupling one or more inductors to a wireless pressure sensor.
Figure 16:
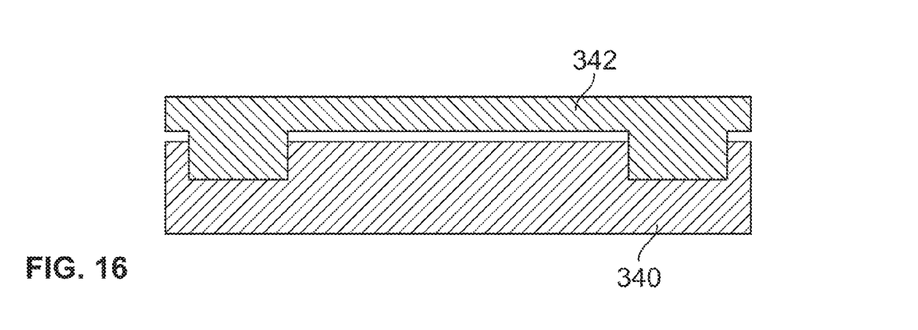
Figure 17:
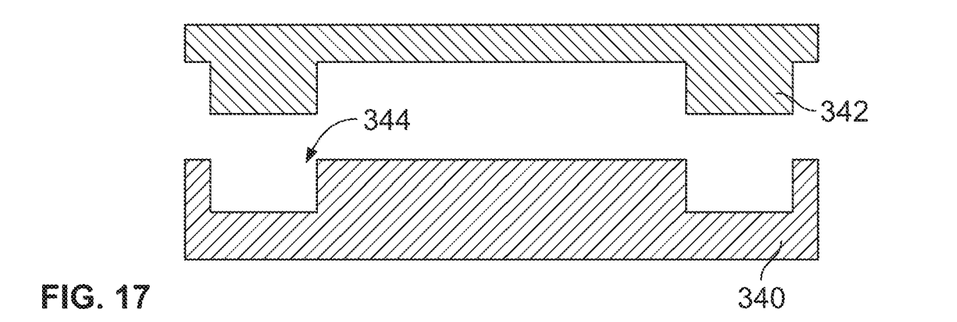

In the exemplary embodiment, pressure sensor 300 includes a third polymer substrate 340, as shown in FIG. 15. In one embodiment, third polymer substrate 340 includes a suitable polymer material such as described above in reference to first polymer substrate 310 and/or second polymer substrate 332. Third polymer substrate 340 may be formed of the same polymer material or a different polymer material as the polymer material forming first polymer substrate 310 and/or second polymer substrate 332. A master mold 342 is positioned with respect to third polymer substrate 340 and pressed into third polymer substrate 340, as shown in FIG. 16, to mold or define a cavity 344 within third polymer substrate 340, as shown in FIG. 17. In alternative embodiments, cavity 344 is formed using any suitable process including, without limitation, a lithography and chemical etching, an ink jet printing, and/or a laser writing process known to those skilled in the art and guided by the teachings herein provided.

Figure 18:
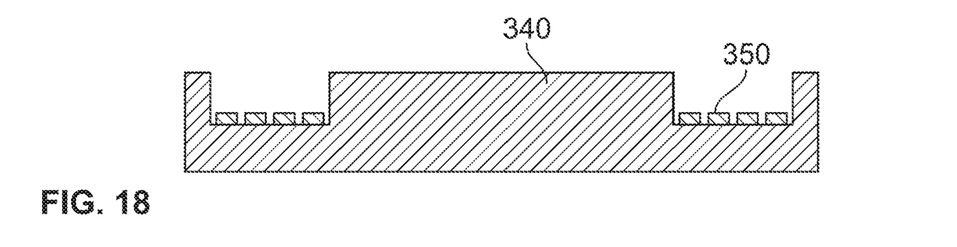

A layer of patterned electrically conducting material including a third inductor 350 is deposited in cavity 344 of third polymer substrate 340, as shown in FIG. 18. Similarly, a fourth polymer substrate 360 including a fourth inductor 370 is formed. Third polymer substrate 340 with patterned third inductor 350 and fourth polymer substrate 360 are then attached or coupled to pressure sensor 300 in axial alignment such that third inductor 350 and fourth inductor 370 are inductively coupled to first inductor 318 and second inductor 328. In one embodiment, third inductor 350 is electrically connected to fourth inductor 370 and to first inductor 318 to form three inductors electrically connected in a series circuit. Third polymer substrate 340 and fourth polymer substrate 360 may be attached or coupled to pressure sensor 300 using any suitable process including, without limitation, an adhesive bonding, laminating, and/or laser welding process.

In an alternative embodiment, pressure sensor 300 includes a third polymer substrate and a fourth substrate formed of a rigid material, such as a fused silica, glass, or high resistivity silicon material. Cavities are formed or defined in the rigid substrates using a suitable wet or dry chemical etch process known to those skilled in the art and guided by the teachings herein provided. The surfaces are patterned with electrically conducting material in a similar manner to the patterning on polymer substrates, as described above. The rigid substrates may be attached or coupled using any suitable process including, without limitation, a fusion bonding, anodic bonding, laser welding, and/or adhesive sealing process.

FIGS. 20-23 show an exemplary sheet of sensors. In one embodiment, a number of individual sensors, such as wireless pressure sensors 400, are affixed or attached to the sheet using an adhesive. Alternatively, the sheet is heated and pressure sensors 400 are pressed into the heated sheet such that the sheet melts and cools around pressure sensors 400 to bind pressure sensors 400 to the sheet. The individual pressure sensors 400 may be flexible polymer sensors or rigid sensors fabricated from a fused silica, glass, or high resistivity silicon material. In one embodiment, the individual pressure sensors 400 may be rigid hermetically sealed capacitive pressure sensors that are electrically connected or inductively coupled to electrically conducting elements on the flexible sheets of polymer. In one embodiment, the electrically conducting elements may be directed towards the external surfaces of the bound pressure sensor sheets or the internal surfaces of the bound pressure sensor sheets. Additional coatings and/or layers may be applied to the external surfaces of the bound pressure sensor sheets. In a further embodiment, a plurality of hermetically sealed capacitive pressure sensors may reside in the cavity between the first substrate and second substrate. The hermetically sealed chamber may be rigid while the remaining portions of the sheet of wireless sensors are flexible. At least a portion of the hermetically sealed capacitive pressure sensors is movable in response to a change in an external condition.

Figure 20:
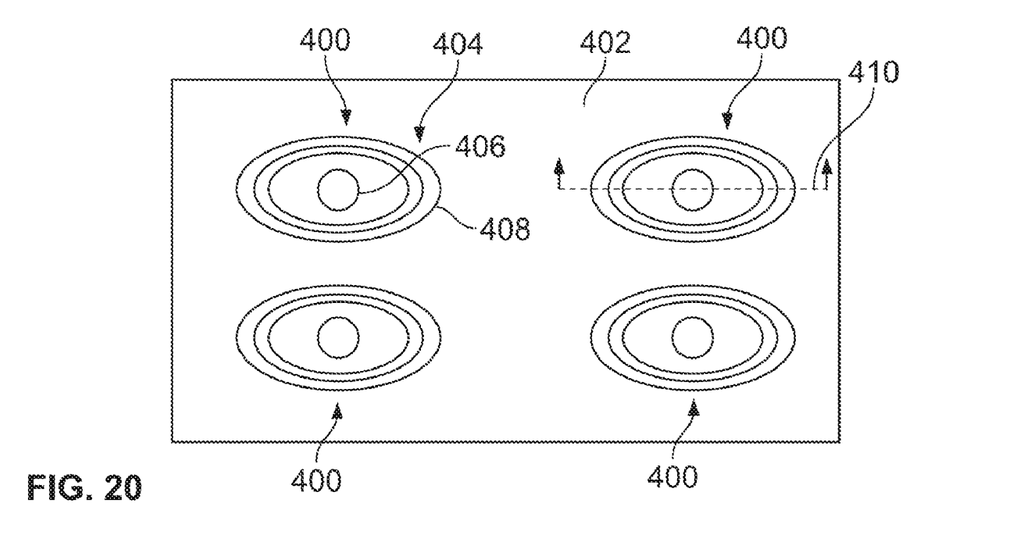
FIGS. 20-23 illustrate an exemplary method for fabricating a sheet of wireless pressure sensors.
Figure 21:
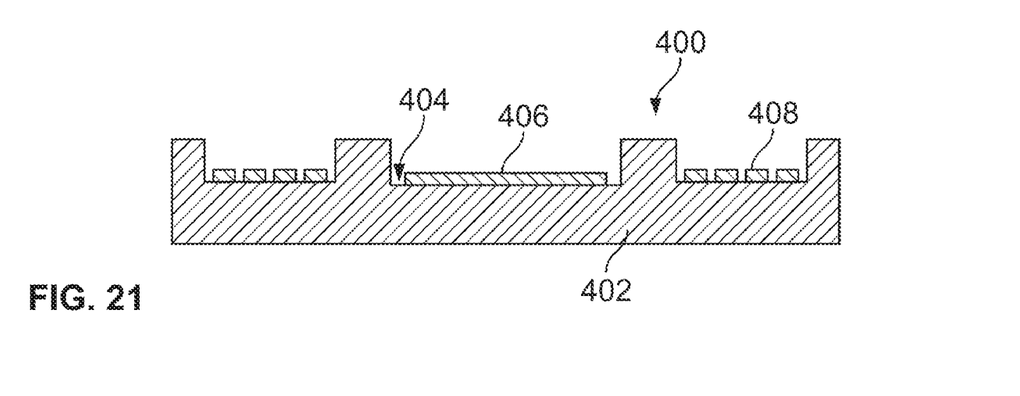

Referring to FIG. 20, a polymer sheet 402 includes a plurality of polymer wireless pressure sensors 400. Polymer sheet 402 is made of any suitable polymer material, such as described above. Pressure sensors 400 are fabricated directly into polymer sheet 402. A plurality of cavities 404 are formed or defined in polymer sheet 402 using a suitable process including, without limitation, a molding, embossing, lithography and chemical etching, ink jet printing, and/or laser writing process known to those skilled in the art and guided by the teachings herein provided. A hermetically sealed capacitive pressure sensor may reside in one or more cavities 404. At least a portion of the hermetically sealed capacitive pressure sensor is movable in response to a change in an external condition. Polymer sheet 402 is patterned with electrically conducting material including a first patterned capacitor plate 406 electrically connected to a first inductor 408. FIG. 21 shows a cross-sectional view of a portion of patterned polymer sheet 400 along a sectional line 410 of FIG. 20 forming a portion of one pressure sensor 400.

Figure 22:
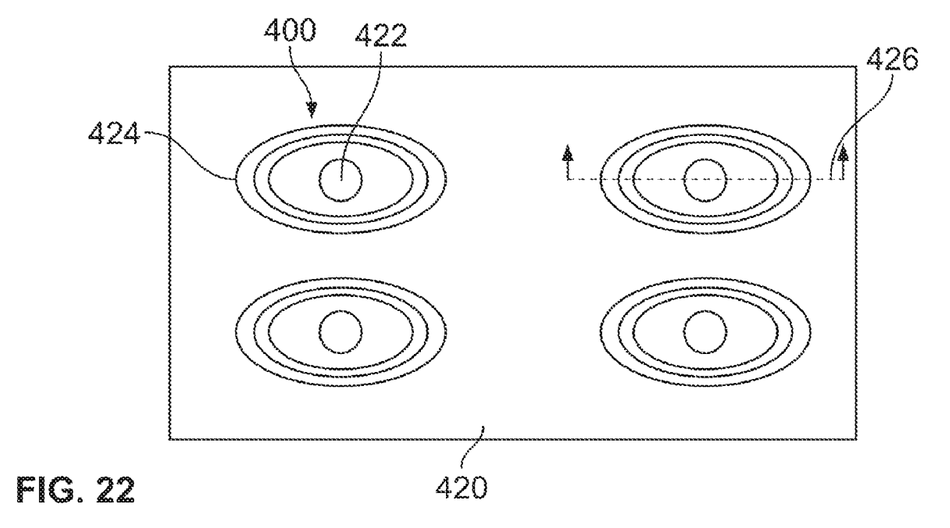
Figure 23:
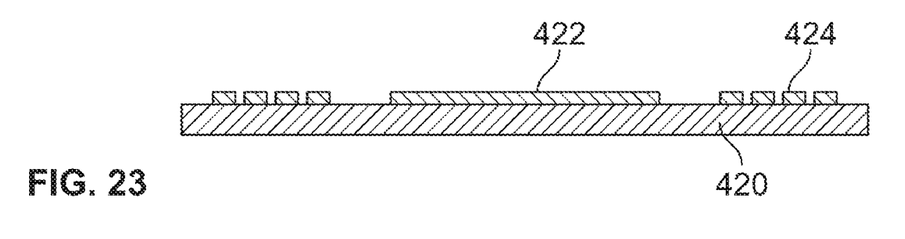

As shown in FIG. 22, a second polymer sheet 420 is patterned with electrically conducting material including a second patterned capacitor plate 422 electrically connected to a second inductor 424. FIG. 23 shows a cross-sectional view of a portion of patterned second polymer sheet 420 along a sectional line 426 of FIG. 20 forming a portion of one pressure sensor 400. A sheet of polymer pressure sensors 400 is formed by coupling or attaching first polymer sheet 402 with first patterned capacitor plates 406 and first inductors 408 to second polymer sheet 420 with second patterned capacitor plates 422 and second inductors 424. With first polymer sheet 402 attached or coupled to second polymer sheet 420, first patterned capacitor plates 406 are axially aligned with corresponding second patterned capacitor plates 422 and first inductors 408 axially aligned with corresponding second inductors 424. First polymer sheet 402 is attached or coupled to second polymer sheet 420 using any suitable process known to those skilled in the art and guided by the teachings herein provided including, without limitation, an adhesive bonding, laminating, and/or laser welding process. In one embodiment, first polymer sheet 402 and/or second polymer sheet 420 is coated with a suitable coating material or layer and/or sealed using a suitable sealing process to form hermetically sealed cavities. In a further embodiment, additional polymer sheets including patterned inductors may be attached in axial alignment to first polymer sheet 402. The additional inductors are electrically connected to each other and to corresponding first inductor 408 to form multiple inductors electrically connected in a series circuit for each polymer pressure sensor 400. In an alternative embodiment, the additional inductors are not electrically connected but are inductively coupled.

In one embodiment, the sheet of polymer pressure sensors 400 may be textured with a controlled topography including features, such as undulations, raised regions or ridges and/or recessed regions or valleys, having suitable dimensions including a height, a width and/or a length, ranging from about 10 nm to about 100 μm such that properties of blood flow at or near an exterior surface of pressure sensor 400 are modified. Patterning the exterior surface of pressure sensor 400 may modify coagulation properties of pressure sensor 400 to prevent or limit endothelialization and reduce a risk of thrombosis or embolism. Patterning the exterior surface of pressure sensor 400 may also modify flow properties of blood at or near the exterior surface to promote or reduce slip at or near the exterior surface to alter a laminar flow characteristic and/or a turbulent flow characteristic of blood across pressure sensor 400. The controlled topography may also form small wells that may be filled with a slow release polymer that has been impregnated with an anitmetabolite substance that inhibits cell division, such as Tacrolimus or Sirolimus. The filled wells may then be covered with a porous polymer layer to allow a time-controlled release of a drug. In a further embodiment, the external surface of pressure sensor 400 may be coated with a deactivated heparin bonded material having anti-coagulation or antimetabolite characteristics.

The sheet of polymer sensors may be used to form an implantable endovascular or intraluminal device, such as a stent or graft. In one embodiment, the sheet of pressure sensors are formed into a tubular intraluminal graft having integrated sensors. The integrated sensors face an interior surface and/or an exterior surface of the intraluminal graft. In one embodiment, the intraluminal graft includes the integrated sensors positioned on the luminal or inner surface of the intraluminal graft. In this embodiment, a tubular cylindrical mold structure is provided. In a particular embodiment, a wire is positioned or wrapped about at least a portion of the tubular cylindrical mold structure. Second polymer sheet 420 including second patterned capacitor plates 422 and second inductors 424 are positioned about the tubular cylindrical mold structure to cover the wire and the tubular cylindrical mold structure. First polymer sheet 402 including first patterned capacitor plates 406 and first inductors 408 is attached or coupled to second polymer sheet 420 to cover second polymer sheet 420. In a particular embodiment, one or more additional polymer sheets including additional patterned inductors are coupled or attached to first polymer sheet 402 such that the additional inductors are electrically connected or inductively coupled to inductors 408 on first polymer sheet 402. The wire and the polymer sheets are released from the tubular cylindrical mold structure. In an alternative embodiment, the polymer sheets are attached in a reverse or opposite order to form an intraluminal graft including integrated sensors on an exterior surface of the intraluminal graft. In a further embodiment, the intraluminal graft may be integrated with sensors on the exterior surface and the interior or luminal surface of the intraluminal graft. In alternative embodiments, multiple planar polymer sheets including integrated sensors are formed into an endovascular or intraluminal graft by wrapping the previously formed polymer sheets with integrated sensors around the tubular cylindrical mold structure.

Figure 24:
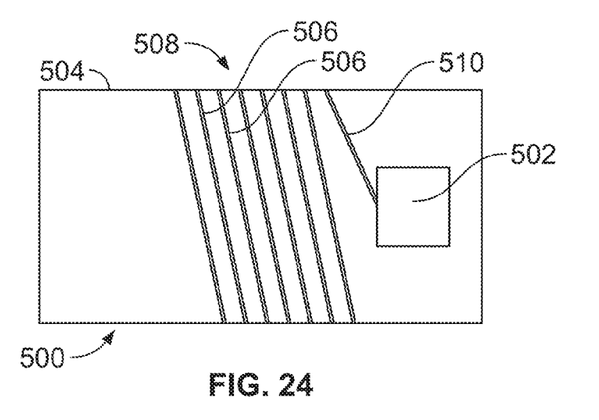
FIG. 24 shows an exemplary intraluminal graft with an integrated pressure sensor.

Referring to FIG. 24, in one embodiment a medical implant, 500 such as an intraluminal graft, including one or more integrated pressure sensors 502 is fabricated or formed from a first sheet 504 of a suitable flexible material. First sheet 504 is patterned with conductive traces 506 that extend diagonally across a first dimension, such as a width, of first sheet 504 such that when first sheet 504 is molded or wrapped about a tubular cylindrical mold structure (not shown), conductive traces 506 are aligned at joined edges (not shown) to create an inductor coil 508 that extends circumferentially about an external surface of intraluminal graft 500. Alternatively, conductive traces 506 may form a continuous inductor coil not fully wrapped around the mold structure. In one embodiment, pressure sensor 502 is a hermetically sealed capacitive pressure sensor. In one embodiment, pressure sensor 502 includes a micro-electromechanical systems (MEMS) capacitive pressure sensor that is attached or coupled to first sheet 504. In one embodiment, pressure sensor 502 includes an application specific integrated circuit (ASIC) with a hermetically sealed chamber, or a hermetically sealed chamber electrically connected or inductively coupled to an ASIC that does not include an integral sensor. At least a portion of the hermetically sealed pressure sensor is movable in response to a change in an external condition. A suitable electrical connection 510 provides electrical communication between pressure sensor 502 and inductor coil 508. First sheet 504 is molded or wrapped about the tubular cylindrical mold structure such that pressure sensor 502 is positioned on an exterior curved surface of intraluminal graft 500. In a particular embodiment, a conducting layer (not shown) is applied or deposited at the joint joining the opposing edges of first sheet 504 to ensure an electrical connection within inductor coil 508. Pressure sensor 502 may be formed as a rigid unit affixed to first sheet 504 or may be formed as a capacitive pressure sensor, such as described herein. In a further embodiment, an additional sheet of flexible material with a patterned capacitor plate is attached or coupled to first sheet 504 in axial alignment to a patterned capacitor plate on first sheet 504 to form a pressure sensor between the sheets of flexible material. The pressure sensor is electrically connected to inductor coil 508 on first sheet 504. Multiple layers of material may be attached or coupled on one or more surfaces of first sheet 504 to form a medical implant, such as an intraluminal graft, with a circumferentially positioned inductor coil that is electrically connected to one or more pressure sensors on an interior or luminal surface and/or an exterior surface of the medical implant.

In a further embodiment, the sheet of sensors provides a system to monitor an intraluminal graft. A shape memory alloy, such as a Nitinol material, may be integrated into the sheet of sensors to aid in compact endovascular delivery of the sheet of sensors to the monitoring site. The sheet of sensors may be delivered to the endovascular monitoring site following a method including wrapping the sheet of sensors about a stent delivery mechanism such that the sheet of sensors is deployed prior to delivery of the stent. The deployed sheet of sensors expands and unfurls with a cylindrical radius larger than a cylindrical radius of the deployed stent to avoid interference of the sheet of sensors with the stent. The sheet of sensors may be delivered using any suitable delivery method known to those skilled in the art and guided by the teachings herein provided. For example, in one embodiment an outer sheath is withdrawn to deliver the sheet of sensors. Alternatively, the sheet of sensors may be delivered by a translumbar deployment after placement of a stent, or the sheet of sensors may be delivered by a transfemoral deployment by an uncoiling of the sensors, wherein an inferior aspect of the roll is pulled to facilitate unwrapping or uncovering the sheet of sensors. The sheet of sensors may be delivered by placing the sheet of sensors on a semirigid wire backbone that is passed through distal openings and proximal openings defined within the sheet of sensors and is detached by twisting or rotating. The wire backbone is then rotated and withdrawn.

Figure 25:
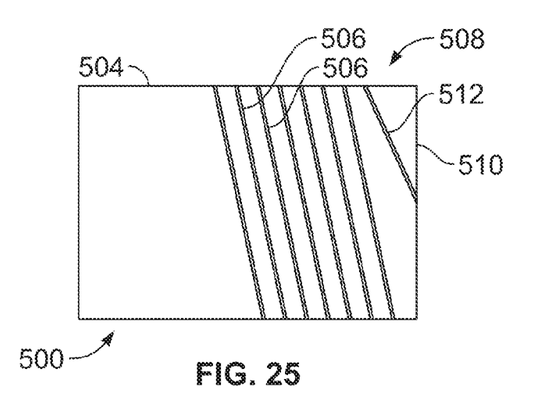
FIGS. 25 and 26 show an exemplary intraluminal graft with an integrated pressure sensor having an inductor coil.
Figure 26:
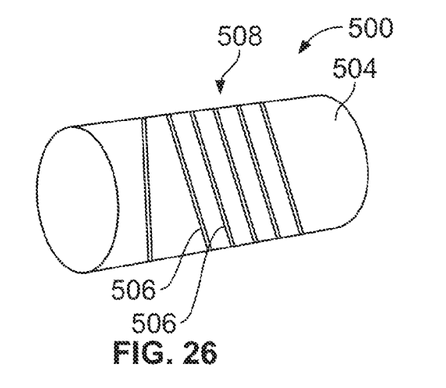

FIGS. 25 and 26 schematically illustrate a method for forming a pressure sensor with an inductor coil 508 including patterning conductive traces 506 formed diagonally across first sheet 504 such that when first sheet 504 is molded or wrapped about the tubular cylindrical mold structure, conductive traces 506 are aligned at a joint that joins the opposing edges of first sheet 504 to form inductor coil 508. A conductive site 510 is patterned on first sheet 504 to provide an electrical connection to a hermetically sealed pressure sensor that is electrically connected to conductive traces 506. In one embodiment, a conducting layer (not shown) is deposited at an edge of first sheet 504 to ensure electrical connection of inductor coil 508. The capacitive pressure sensor 502 is attached or coupled to first sheet 504 and to inductor coil 508. In a further embodiment, an external surface of first sheet 504 may be textured with features, such as undulations, raised regions or ridges and/or recessed regions or valleys, having suitable dimensions including a height, a width and/or a length, ranging from about 10 nm to about 100 μm such that properties of blood flow at or near the external surface of first sheet 504 are modified. Patterning the external surface of first sheet 504 may modify coagulation properties of first sheet 504 to prevent or limit endothelialization and reduce a risk of thrombosis and/or embolism. Patterning the external surface may also modify flow properties of blood at or near the external surface to promote or reduce slip at or near the external surface to alter a laminar flow characteristic and/or a turbulent flow characteristic of blood through the intraluminal graft. The controlled topography may also form small wells that may be filled with a slow release polymer that has been impregnated with an anitmetabolite substance that inhibits cell division, such as Tacrolimus or Sirolimus. The filled wells may then be covered with a porous polymer layer to allow a time-controlled release of a drug. In a further embodiment, the external surface of the pressure sensor may be coated with a deactivated heparin bonded material having anti-coagulation or antimetabolite characteristics.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A method for fabricating a wireless pressure sensor, the method comprising:
   providing a first substrate;
   controllably displacing a portion of the first substrate to form a cavity;
   patterning a conducting material on the first substrate to form a first capacitor plate and a first inductor;
   providing a second substrate;
   patterning a conducting material on the second substrate to form a second capacitor plate;
   attaching the second substrate to the first substrate to seal the cavity such that at least a portion of the second substrate is movable with respect to the first substrate within the cavity in response to a change in an external condition.

2. A method in accordance with claim 1 wherein the second capacitor plate is axially aligned with the first capacitor plate.

3. A method in accordance with claim 1 wherein the second substrate further comprises a second inductor.

4. A method in accordance with claim 3 wherein the second inductor is electrically connected to the first inductor.

5. A method in accordance with claim 1 further comprising:
   providing at least one additional substrate;
   patterning a conducting material on the at least one additional substrate to form an additional inductor; and
   attaching the at least one additional substrate to the first substrate.

6. A method in accordance with claim 5 wherein the additional inductor is electrically connected to at least one of the first inductor and the second inductor.

7. A method in accordance with claim 1 wherein each of the first substrate and the second substrate comprises one of a non-porous polymer, a low-porosity polymer, polytetrafluoroethylene, porous polytetrafluoroethylene, expanded polytetrafluoroethylene, and combinations thereof.

8. A method in accordance with claim 1 wherein a portion of the first substrate is controllably displaced using one of a molding, embossing, printing, laser writing, and ink jet printing process.

9. A method in accordance with claim 1 further comprising patterning at least one of an exterior surface of the first substrate and an exterior surface of the second substrate with a controlled topography having a plurality of features, each feature of the plurality of features having a height of about 10 nm to about 100 μm.

10. A method in accordance with claim 1 further comprising applying at least one coating layer to at least one of the first substrate and the second substrate, wherein the at least one coating layer comprises a deactivated heparin bonded material.

11. A method in accordance with claim 10 further comprising creating a plurality of wells in the exterior surface, each well of the plurality of wells including a slow release polymer impregnated with an anitmetabolite substance that inhibits cell division.

12. A method in accordance with claim 1 wherein each of the first substrate and the second substrate comprises one of a fused silica, high resistivity silicon, and glass material.

13. A wireless pressure sensor comprising:
a first substrate defining a cavity;
a first conducting material patterned on the first substrate, the patterned conducting material forming a first capacitor plate and a first inductor;
a second substrate; and
a second conducting material patterned on the second substrate, the patterned conducting material forming a second capacitor plate, the second substrate coupled to the first substrate to seal the cavity such that at least a portion of the second substrate is movable with respect to the first substrate within the cavity in response to a change in an external condition.

14. A wireless pressure sensor in accordance with claim 13 wherein the second capacitor plate is axially aligned with the first capacitor plate.

15. A wireless pressure sensor in accordance with claim 13 wherein the second patterned conducting material further forms a second inductor.

16. A wireless pressure sensor in accordance with claim 15 wherein the second inductor is electrically connected to the first inductor.

17. A wireless pressure sensor in accordance with claim 13 further comprising:
at least one additional substrate coupled to the first substrate; and
an additional conducting material patterned on the at least one additional substrate to form an additional inductor.

18. A wireless pressure sensor in accordance with claim 17 wherein the additional inductor is electrically connected to one of the first inductor and the second inductor.

19. A wireless pressure sensor in accordance with claim 13 wherein each of the first substrate and the second substrate comprises one of a non-porous polymer, a low-porosity polymer, polytetrafluoroethylene, porous polytetrafluoroethylene, expanded polytetrafluoroethylene, and combinations thereof.

20. A wireless pressure sensor in accordance with claim 19 further comprising at least one coating layer applied to at least one of the first substrate and the second substrate, wherein the at least one coating layer comprises a deactivated heparin bonded material.

21. A wireless pressure sensor in accordance with claim 19 further comprising a plurality of wells created in an exterior surface of the wireless pressure sensor, each well of the plurality of wells including a slow release polymer impregnated with an anitmetabolite substance that inhibits cell division.

22. A wireless pressure sensor in accordance with claim 13 wherein each of the first substrate and the second substrate comprises one of a fused silica, high resistivity silicon, and glass material.

23. A method for fabricating a flexible sheet of wireless sensors, the method comprising:
providing a first substrate;
controllably displacing a plurality of portions of the first substrate to form a plurality of cavities;
patterning a conducting material to form a plurality of corresponding first capacitor plates and corresponding first inductors;
providing a second substrate;
patterning a conducting material on the second substrate to form a plurality of second capacitor plates;
attaching the second substrate to the first substrate to seal each cavity such that at least a portion of the second substrate is movable with respect to the first substrate within the cavity in response to a change in an external condition.

24. A method for fabricating an endovascular implant from a sheet of flexible material including at least one wireless sensor, the method comprising:
providing a sheet of flexible material;
patterning conductive traces diagonally across the sheet of flexible material such that when the flexible sheet is positioned about a tubular cylindrical mold structure, the conductive traces are aligned to create an inductor coil; and
affixing at least one sensor to the sheet of flexible material, the at least one sensor electrically connected to the inductor coil; and
wrapping the sheet of flexible material about the tubular cylindrical mold structure such that the inductor coil wraps circumferentially around the sheet of flexible material.

25. A method in accordance with claim 24 wherein affixing at least one sensor to the sheet of flexible material comprises affixing at least one hermetically sealed micro-electromechanical systems capacitive pressure sensor to the sheet of flexible material.

26. A method in accordance with claim 24 further comprising integrating a wire comprising a shape memory alloy into the sheet of flexible material.

27. A method in accordance with claim 24 wherein the at least one sensor is affixed to the sheet of flexible material using an adhesive.

28. A method in accordance with claim 24 wherein the at least one sensor is pressed into a heated sheet of flexible material such that the heated sheet of flexible material melts about the at least one sensor.

* * * * *